2,877,220
METHOD OF PREPARING LYSINE

Robert C. O'Neill, New York, N. Y., and Roger J. Tull, Metuchen, N. J., assignors to Merck & Co., Inc., Rahway, N. J., a corporation of New Jersey No Drawing. Application October 30, 1956
Serial No. 619,109

14 Claims. (Cl. 260—239.3)

This invention relates to processes and intermediate products useful in the synthesis of lysine. More particularly, it is concerned with a new method of producing 6-acylamido-2-chlorohexanoic acid and intermediate compounds useful in preparing this product.

The compound, 6-acylamido-2-chlorohexanoic acid can be converted to the amino acid lysine in accordance with methods known in this art. Lysine, 2,6-diaminohexanoic acid, is one of the essential amino acids which is necessary for the maintenance of health and the proper assimilation of foods in animals. However, many sources of protein lack an adequate amount of lysine and therefore it is desirable to supplement animal diets with lysine. Accordingly, this amino acid is of considerable commercial importance.

Processes for the production DL-lysine are known in the art. However, the prior syntheses suffer from several disadvantages and are not particularly suitable for use on a commercial scale. Thus, the syntheses involve complex reactions and result in poor yields of the desired product. Hence, improved methods whereby lysine can be produced commercially have been sought.

It is an object of the present invention to provide a new method for the production of 6-acylamido-2-chlorohexanoic acid, which avoids many of the difficulties of the prior methods of preparing this product. It is a further object to provide new acyl derivatives of caprolactams and 3-chlorocaprolactam, useful as intermediates in the synthesis of 6-acylamido-2-chlorohexanoic acid. Another object is to provide methods of preparing these derivatives of caprolactam. Other objects will be apparent from the detailed description of our invention hereinafter provided.

In accordance with the present invention, it is now found that 6-acylamido-2-chlorohexanoic acid can be prepared from caprolactam by a method comprising acylating caprolactam to produce the corresponding acyl derivative, chlorinating this acyl derivative to produce N-acyl-3-chlorocaprolactam, and hydrolyzing this chlorolactam to produce 6-acylamido-2-chlorohexanoic acid. These reactions can be shown structurally as follows:

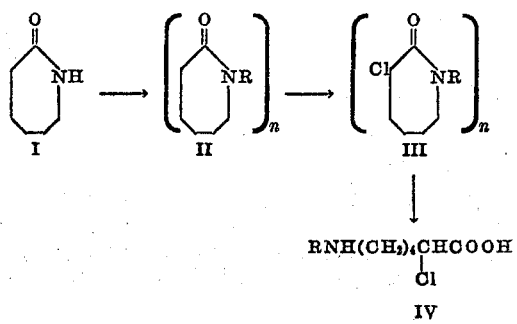

wherein R represents a monocarboxylic or dicarboxylic acid aromatic acid radical, and $n$ represents the integer 1 or 2.

In the first step of the foregoing described process the caprolactam (I) is converted to the corresponding acyl compound by reaction with a suitable monocarboxylic or dicarboxylic aromatic acid acylating agent. For example, this can be accomplished by reacting the caprolactam with an aromatic acid chloride such as benzoyl chloride or terephthaloyl chloride. The reaction is most conveniently carried out in the presence of an acid acceptor, preferably a tertiary amine such as pyridine or dimethylaniline.

In the second step of the above-described reactions, the acylated caprolactam (II) is chlorinated to produce the corresponding 3-chloro substituted acyl lactam. This reaction is conveniently carried out by reacting the acyl lactam with a chlorinating agent such as sulfuryl chloride; the chlorination being readily effected by heating the reactants. Alternatively, the acylated caprolactam can be chlorinated by reaction with chlorine.

In accordance with the final step of the process, the N-acylated-3-chlorocaprolactam (III) is hydrolyzed to produce the 6-acylamido-2-chlorohexanoic acid (IV). This hydrolysis is carried out by reacting the chlorolactam in aqueous solution with a base, preferably an inorganic base such as an alkali metal hydroxide. In effecting this hydrolysis, it is found that maximum yields of the desired product are obtained when the reaction is carried out using only a slight excess of the base at a temperature from about —10° C. to 75° C.

The following examples are present as illustrative of the methods for carrying out the above-described reactions:

Example 1

N-benzoylcaprolactam.—A mixture of 11.3 g. of caprolactam, 14.1 g. of benzoyl chloride and 35 cc. of pyridine was boiled under reflux for six hours. The mixture was cooled and poured into water. The N-benzoylcaprolactam was collected on a filter and washed with water. Yield, 18.35 g.; M. P. 67–70° C.

A sample was recrystallized from aqueous alcohol for analysis, M. P. 67–70° C.

Analysis.—Calc. for $C_{13}H_{15}O_2N$: C, 71.9; H, 6.97; N, 6.45. Found: C, 71.88; H, 6.61; N, 6.12.

Example 2

N-benzoylcaprolactam.—A mixture of 90.4 g. of caprolactam, 115.0 g. of benzoyl chloride and 99.0 g. of dimethylaniline was heated at 90° C. for three hours. The mixture was poured onto 900 cc. of water containing 16 cc. of 2.5 N—HCl and stirred for 30 minutes. The precipitated N-benzoylcaprolactam was filtered, washed with water and dried in air. Yield, 164.2 g. (94.6%); M. P. 69–71°.

Example 3

N-benzoyl-3-chlorocaprolactam.—A mixture of 4.34 g. of N-benzoylcaprolactam, 3.0 g. of sulfuryl chloride and 0.07 g. of iodine was heated at 70° C. for one hour. The mixture was poured onto ice and allowed to stand overnight at room temperature. The N-benzoyl-3-chlorocaprolactam was collected on a filter and triturated with alcohol. Yield, 2.0 g.; M. P. 112–116°.

A sample of the crude product was recrystallized twice from alcohol for analysis, M. P. 120–121.5° C.

Analysis.—Calc. for $C_{13}H_{14}O_2NCl$: C, 62.03; H, 5.61; N, 5.57; Cl, 14.08. Found: C, 61.93; H, 5.31; N, 5.47; Cl, 14.3.

Example 4

*N-benzoyl-3-chlorocaprolactam.*—A mixture of 43.4 g. of N-benzoylcaprolactam, 17.0 cc. of sulfuryl chloride and 44 cc. of carbon tetrachloride was stirred at 40° C. for 26 hours. The mixture was evaporated to dryness, stirred with 50 cc. of isopropyl alcohol at 75° C., cooled to 0–5° C., filtered and the N-benzoyl-3-chlorocaprolactam washed with 2 x 40 cc. of cold isopropyl alcohol. Dried in air. Weight 43.8 g. (87%); M. P. 119.5–121.5° C.

Example 5

*N-benzoyl-3-chlorocaprolactam.*—15 g. (0.069 mole) of N-benzoylcaprolactam was dissolved in 25 ml. of carbon tetrachloride, and chlorine gas as introduced into the refluxing solution at a vigorous rate for four hours. The solvent was then evaporated at room temperature, and the residual sirup triturated with water, which was removed by decantation. On addition of ethanol to the sirup, crystallization began immediately. The crystalline slurry was filtered, and the cake was washed with ethanol, then recrystallized from isopropanol. The N-benzoyl-3-chlorocaprolactam prepared in this manner melted at 116–118° C.

Example 6

*6-benzamido-2-chlorohexanoic acid.*—A suspension of 3 g. of N-benzoyl-3-chlorocaprolactam (III) in 14.5 cc. of 0.86 N-sodium hydroxide was stirred at 25° C. for 21 hours. The solution was acidified with hydrochloric acid and the 6-benzamido-2-chlorohexanoic acid was collected on a filter and washed with water. Yield, 2.34 g.; M. P. 126–134° C. The structure was confirmed by mixed melting point determination with an authentic sample of 6-benzamido-2-chlorohexanoic acid.

Example 7

*6-benzamido-2-chlorohexanoic acid.*—To a suspension of 10 g. of N-benzoyl-3-chlorocaprolactam in 10 cc. of methanol was added 20 cc. of 2 N—NaOH over a period of one hour at 0–5° C. The mixture was stirred for an additional two hours, acidified with concentrated hydrochloric acid, partially evaporated to remove the methanol, filtered, and the 6-benzamido-2-chlorohexanoic acid washed with water. Yield 10.05 g. (94%); M. P. 137–138° C.

Example 8

*N,N'-terephthaloylbiscaprolactam.*—To a mixture of 90.4 g. of caprolactam and 152 cc. of dimethylaniline was added 81.2 g. of terephthaloyl chloride portionwise over eight minutes. The mixture was heated at 110–115° C. with stirring for one and one-half hours, poured into dilute hydrochloric acid and the product collected on a filter. Yield, 128 g. (90%); M. P. 200–202.5° C. A small amount was recrystallized from dimethylformamide. M. P. 201.5–203° C.

*Analysis.*—Calc. for $C_{20}H_{24}N_2O_4$: C, 67.4; H, 6.80; N, 7.87. C, 67.78; H, 7.04; N, 7.46.

Example 9

*N,N'-terephthaloylbis-3-chlorocaprolactam.* — A suspension of 35.6 g. of N,N'-terephthaloylbiscaprolactam in 18.7 cc. of sulfuryl chloride and 100 cc. of ethylene dichloride was stirred and heated at 25–30° C. for 46 hours and then at 45–50° C. for an additional 46 hours. The mixture was cooled, filtered and the N,N'-terephthaloylbis-3-chlorocaprolactam wished with ethylene dichloride. Weight 11.3 g.; M. P. 224–226.5° C. The product was recrystallized from dimethylformamide. M. P. 229–231°.

*Analysis.*—Calc. for $C_{20}H_{22}Cl_2N_2O_4$: N, 6.59; Cl, 16.68. Found: N, 6.89; Cl, 16.27.

Example 10

*N,N' - terephthaloylbis - 6 - amino - 2 - chlorohexanoic acid.*—To a suspension of 4.25 g. of N,N'-terephthaloyl-bis-3-chlorocaprolactam in 8.5 cc. of methanol was added 10 cc. of 2 N—NaOH portionwise over 40 minutes at 5–10°. The mixture was stirred at 30° for four hours, filtered to remove unreacted lactam, and acidified with dilute hydrochloric acid. After crystallization was complete, the crude N,N'-terephthaloylbis-6-amino-2-chlorohexanoic acid was collected on a filter and washed with water. Weight 3.1 g. The crude material was stirred with aqueous isopropyl alcohol, the suspension filtered to remove insolubles, and the filtrate evaporated to dryness. The residue was recrystallized once from aqueous isopropyl alcohol and once from methanol. M. P. 204–207° C.

*Analysis.*—Calc. for $C_{20}H_{26}Cl_2N_2O_6$: C, 52.2; H, 5.7; N, 6.08; Cl, 15.38. Found: C, 52.25; H, 5.75; N, 6.02; Cl, 15.15.

Various changes and modifications may be made in carrying out the present invention without departing from the spirit and scope thereof. Insofar as these changes and modifications are within the purview of the annexed claims, they are to be considered as part of our invention.

What is claimed is:

1. A process for the preparation of 6-acylamido-2-chlorohexanoic acid which comprises reacting caprolactam with an aromatic carboxylic acid chloride having not more than eight carbon atoms to produce the corresponding N-acyl derivative, intimately contacting said acylated caprolactam with a chlorinating agent to produce the corresponding N-acyl-3-chlorocaprolactam, and treating said chlorolactam with a base to produce the corresponding 6-acylamido-2-chlorohexanoic acid.

2. The process which comprises reacting caprolactam with benzoyl chloride to produce N-benzoylcaprolactam, intimately contacting said benzoylcaprolactom with sulfuryl chloride to produce N-benzoyl-3-chlorocaprolactam, and subject said 3-chloroprolactam to hydrolysis by reaction with an alkali metal hydroxide to produce 6-benzamido-2-chlorohexanoic acid.

3. A process which comprises reacting caprolactam with benzoyl chloride to produce N-benzoylcaprolactam, intimately contacting said benzoylcaprolactam with chlorine to produce N-benzoyl-3-chlorocaprolactam, and hydrolyzing said chlorolactam by reaction with an alkali metal hydroxide to produce 6-benzamido-2-chlorohexanoic acid.

4. The process which comprises reacting caprolactam with terephthaloyl chloride to produce N,N'-terephthaloyl-biscaprolactam, intimately contacting said acylated lactam with sulfuryl chloride to produce N,N'-terephthaloylbis-3-chlorocaprolactam, and hydrolyzing said acylated chlorolactam with an alkali metal hydroxide to produce N,N'-terephthaloylbis-6-amino-2-chlorohexanoic acid.

5. The process which comprises reacting an N-acyl caprolactam wherein the acyl group is an aromatic carboxylic acid radical having not more than eight carbon atoms with a chlorinating agent to produce N-acyl-3-chlorocaprolactam.

6. The process which comprises reacting N-benzoylcaprolactam with sulfuryl chloride to obtain N-benzoyl-3-chlorocaprolactam.

7. The process which comprises reacting N-benzoylcaprolactam with chlorine to produce N-benzoyl-3-chlorocaprolactam.

8. The process which comprises reacting N,N'-terephthaloylbiscaprolactam with sulfuryl chloride to produce N,N'-terephthaloylbis-3-chlorocaprolactam.

9. An N-acyl-3-chlorocaprolactam wherein the acyl group is an aromatic carboxylic acid radical having not more than eight carbon atoms.

10. N-benzoyl-3-chlorocaprolactam.

11. N,N'-terephthaloylbis-3-chlorocaprolactam.

12. The process which comprises hydrolyzing an N-acyl-3-chlorocaprolactam wherein the acyl group is an aromatic carboxylic acid radical having not more than eight carbon atoms by reaction with a base to produce the corresponding 6-acyl-amino-2-chlorohexanoic acid.

13. The process which comprises reacting N-benzoyl-3-chlorocaprolactam with an alkali metal hydroxide to produce 6-benzamido-2-chlorohexanoic acid.

14. The process which comprises reacting N,N'-terephthaloylbis-3-chlorocaprolactam with an alkali metal hydroxide to produce N,N'-terephthaloylbis-6-amino-2-chlorohexanoic acid.

References Cited in the file of this patent

UNITED STATES PATENTS

| | | |
|---|---|---|
| 2,303,177 | Schlack | Nov. 24, 1942 |
| 2,453,234 | Koch | Nov. 9, 1948 |

OTHER REFERENCES

Galat: J. Am. Chem. Soc. 69, page 86 (1947).
Eck et al.: Chem. Abst. 28, pages 7249–50.